United States Patent [19]

Wharton et al.

[11] Patent Number: 4,540,420

[45] Date of Patent: Sep. 10, 1985

[54] DEHUMIDIFIER FOR FLEXIBLE ENVELOPES

[76] Inventors: E. B. Wharton, 6222 Summer Lake Dr.; T. R. Iglehart, 897 Baird Dr., both of Baton Rouge, La. 70817

[21] Appl. No.: 633,601

[22] Filed: Jul. 23, 1984

[51] Int. Cl.[3] .............. B01D 53/06

[52] U.S. Cl. .............. 55/181; 55/208; 55/390

[58] Field of Search .............. 55/34, 60, 77–79, 55/179, 181, 208, 388, 390; 432/220, 221, 223

[56] References Cited

U.S. PATENT DOCUMENTS

| | | | |
|---|---|---|---|
| 2,115,226 | 4/1938 | Kopp | 55/390 |
| 2,283,990 | 5/1942 | Higley | 55/34 X |
| 3,398,510 | 8/1968 | Pennington | 55/208 X |
| 3,619,987 | 11/1971 | Colvin et al. | 55/390 X |
| 3,774,374 | 11/1973 | Dufour et al. | 55/388 X |
| 3,780,498 | 12/1973 | Wenner | 55/390 X |
| 4,452,612 | 6/1984 | Mattia | 55/390 X |

FOREIGN PATENT DOCUMENTS

| | | | |
|---|---|---|---|
| 2460401 | 7/1975 | Fed. Rep. of Germany | 55/390 |

*Primary Examiner*—Robert Spitzer

*Attorney, Agent, or Firm*—Keaty & Keaty

[57] ABSTRACT

A dehumidifier for flexible envelopes having a process side for dehumidifying air from the flexible envelope and a regeneration side for regenerating the dessicant used for dehumidification. A regeneration wheel containing a dessicant is rotatably mounted in a slot between the process and the regeneration compartments so that a first section of the wheel extends into the process compartment and a second section of the wheel extends into the regeneration compartment. The process and regeneration compartments are further divided by a plurality of partitions transverse to the wall forming the regeneration and process compartments. A stream of air is generated in the process compartment by means of a blower wheel which is driven by a motor in the lower regeneration compartment. The static pressure in the lower process compartment is slightly lower than the pressure in the lower regeneration compartment, thereby preventing migration of flammable gases to electrical parts in the lower regeneration compartment. The pressure differential is reversed, however, in the upper regeneration and process compartments so that the static pressure in the process compartment is slightly higher than in the regeneration compartment, thereby preventing migration of moist air into the process side of the compartment after the process air has been dehumidified.

11 Claims, 6 Drawing Figures

DEHUMIDIFIER FOR FLEXIBLE ENVELOPES

BACKGROUND OF THE INVENTION

1. Field of the Invention

This invention relates to dehumidifiers, especially dehumidifiers suitable for use with flexible envelopes containing flammable gases and air. Such flexible envelopes are disposed around aircraft when they are being stored.

2. Discussion of the Prior Art

Prior art dehumidifiers have disclosed structures in which parallel, adjacent process and regeneration compartments are employed. A regeneration wheel containing a desiccant is rotatably mounted in the container so that a process portion of the wheel extends into the process compartment and a regeneration portion of the wheel extends into the regeneration compartment. Air to be dehumidified is then circulated through the process side of the compartment, directed through the wheel containing the desiccant, and returned to the structure being dehumidified. On the regeneration side of the prior art devices, a stream of hot air is directed through the desiccant in the wheel to heat it and dry it, thereby removing moisture from the desiccant.

This structure has been found to be unsuitable for dehumidifying structures such as flexible envelopes used in storing aircraft. These flexible envelopes usually contain flammable gases from the aircraft being stored, and if the flammable gases are brought into contact with such things as electrical motors, explosions usually ensue. Furthermore, the prior art structures were unsuitable in dehumidifying flexible structures because they were designed for use with rigid structures such as buildings.

Accordingly, it is an object of the present invention to provide a dehumidifier for flexible envelopes which prevents migration of flammable gases from the process side of the compartment to electrical motors and components contained in the regeneration side of the dehumidifier.

It is also an object of the invention to provide a dehumidifier for flexible envelopes with dampers disposed appropriately in the interior of the dehumidifier to avoid static flow problems with the flexible envelope.

SUMMARY OF THE INVENTION

The aforementioned objects are achieved by providing a dehumidifier for flexible envelopes containing flammable gases and air, the dehumidifier comprising a container divided by an interior wall into a process side and a regeneration side. First and second partitions within the container transverse to the wall form a lower, intermediate and upper process compartment on the process side and a lower, intermediate and upper regeneration compartment on the regeneration side. The first partition is provided with perforations for permitting air to flow from the lower to the intermediate regeneration compartments, and an orifice in the first partition for permitting air to flow from the lower to the intermediate process compartments.

A regeneration wheel containing a desiccant is rotatably mounted on the second partition so that a process section of the second wheel extends into the process compartment and a regeneration section of the wheel extends into the regeneration compartment, the wall between the regeneration and the process compartments being provided with a slot through which the wheel is disposed, the partition on which the wheel is mounted being provided with openings through which air may flow from the intermediate compartments through the wheel.

A process inlet conveys air from the flexible envelope to the lower process compartment, and a process outlet permits air to move from the upper process compartment back to the flexible envelope. A regeneration inlet into the lower regeneration compartment permits ambient air to enter, and a regeneration outlet permits air to flow from the upper regeneration compartment to the outside of the dehumidifier container. A damper is provided on the regeneration outlet for regulating the flow of air out of the upper regeneration compartment, and another damper is provided in the orifice between the lower process compartment and intermediate process compartment for regulating the flow of air through the orifice.

An enclosure is provided within the lower process compartment, and a process blower wheel is rotatably disposed in the enclosure for generating a flow of air in the enclosure and directing it towards the orifice and second damper. The process blower wheel is driven by a motor in the regeneration compartment by means of a driving shaft extending from the motor to the process blower wheel.

A regeneration blower wheel is located in the lower regeneration compartment, and is driven by the same motor which drives the process blower wheel. The regeneration blower wheel is enclosed in a compartment having an opening through which air is expelled to the lower regeneration compartment.

an elongated metal box is provided as a heating element within the regeneration compartment. The box is surrounded by a tubular heating coil disposed in heat transferring relationship to the box, and heated oil is pumped through the tubular heating coil to heat the box and the air which flows through it, thereby heating air as it moves from the lower regeneration compartment to the intermediate regeneration compartment, and thence to the regeneration wheel. The oil being provided to the coils is stored in a tank from which it is pumped, the oil being covered by nitrogen gas to prevent degradation of its hydrocarbon content.

With this structure, the pressure in the lower process compartment can be maintained at a lower level than the static pressure in the lower regeneration compartment, thereby preventing migration of flammable gases from the lower process compartment to the lower regeneration compartment where the electrical motor, heating coils, and oil pump are lcoated. The pressure differential is reversed, however, adjacent the regeneration wheel in the upper compartments, and the pressure on the process side is slightly higher than on the regeneration side, thereby preventing the migration of undehumidified air to the process side of the compartment through the slot in the wall through which the regeneration wheel is placed.

DETAILED DESCRIPTION OF THE PREFERRED EMBODIMENT

Figure 1:
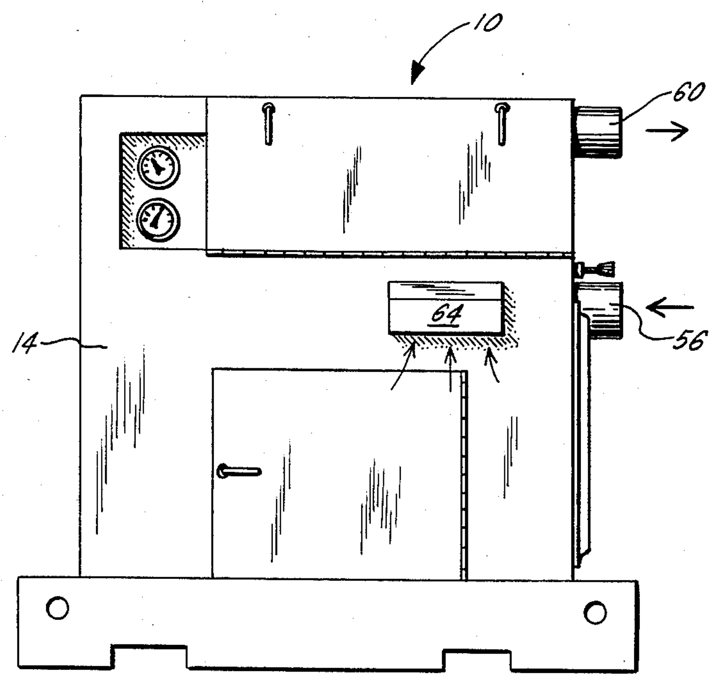
FIG. 1 is a side elevational view of the dehumidifier of the present invention.

A dehumidifier 10 for a flexible envelope 12 containing flammable gases and air is shown in the drawings. As shown especially in FIG. 3, dehumidifier 10 comprises a container 14 divided by an interior wall 16 into a process side 18 and a regeneration side 20.

A first partition 22 and a second partition 24 are provided transverse to wall 16, partitions 22, 24 and wall 16 forming a lower process compartment 26, intermediate process compartment 28 and upper process compartment 30 on process side 18. The first and second partitions 22, 24 form a lower regeneration compartment 32, intermediate regeneration compartment 34 and upper regeneration compartment 36 on the regeneration side 20 of dehumidifier 10. First partition 22 is provided with perforations 38 for permitting air to flow from lower regeneration compartment 32 to intermediate regeneration compartment 34, and an orifice 40 is provided in first partition 22 for permitting air to flow from lower process compartment 26 to intermediate process compartment 28.

A regeneration wheel 42 containing a desiccant 44 (silica gel in preferred embodiments) is rotatably mounted on second partition 24 by means of a spindle perpendicular to partition 24 which communicates with a central hole in wheel 42. A process section 46 of wheel 42 extends into upper process compartment 30 and a regeneration section 48 of wheel 42 extends into upper regeneration compartment 36, wall 16 being provided with a slot 50 through which wheel 42 is disposed. Slot 50 is further provided with a flexible flap seal 52 for reducing migration of air from upper regeneration compartment 36 to upper process compartment 30. Second partition 24 is provided with openings 54 in the region of second partition 24 on which wheel 42 is mounted and through which air may flow from intermediate compartments 28, 34 through wheel 42.

A process inlet 56 is provided into lower process compartment 26 through which air is conveyed from flexible envelope 12 through delivery conduit 58. A process outlet 60 is provided from upper process chamber 30 through which air moves into return conduit 62 and is conveyed back to flexible envelope 12.

A regeneration inlet 64 is provided into lower regeneration compartment 32 through a wall of container 14, and a regeneration outlet 66 is similarly provided through which air is conveyed from upper regeneration compartment 36 to the outside of container 14. Regeneration outlet 66 is provided with a first damper 68 for regulating the flow of air out of upper regeneration compartment 36.

An enclosure 70 is provided within lower process compartment 26, enclosure 70 having a first open end 72 in fluid communicating relationship with the interior of lower process compartment 26 and a second open end (not shown) in fluid delivering relationship to orifice 40 in first partition 22. A second damper 74 is provided in orifice 40 for regulating the flow of air from lower process compartment through orifice 40 and into intermediate process compartment 28.

Figure 5:
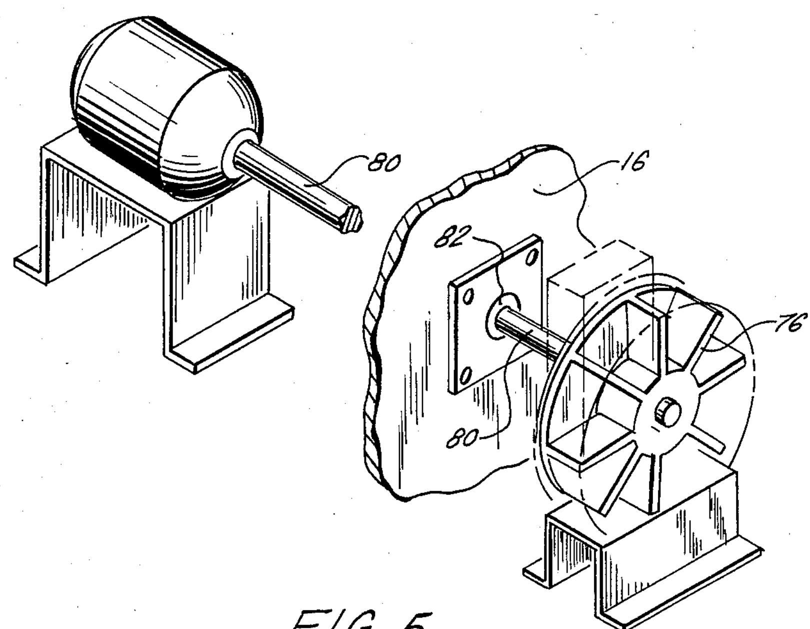
FIG. 5 is a fragmentary view of the process blower wheel and the motor which drives it, portions of the dividing wall and drive shaft being broken away for clarity.
Figure 6:
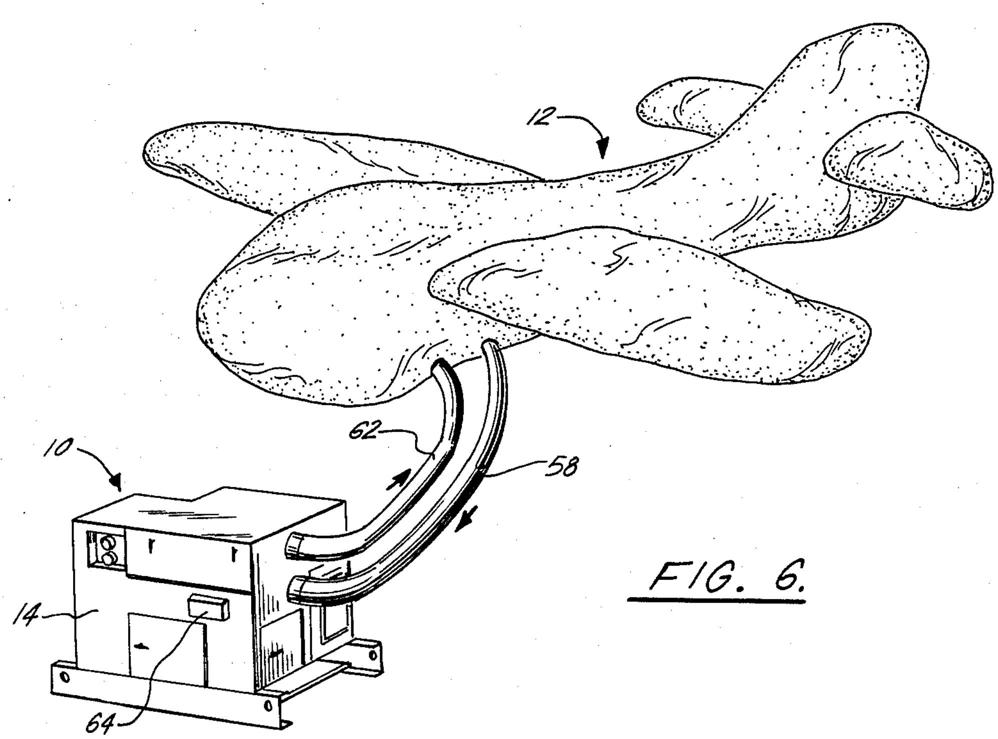
FIG. 6 is a perspective view of the dehumidifier of the instant invention in use with a flexible envelope disposed around a stored aircraft.

A process blower wheel 76 is rotatably disposed within enclosure 70 for generating a flow of air in enclosure 70 and directing it towards orifice 40. A motor 78 in lower regeneration compartment 32 is provided with a driving shaft 80 extending from motor 78 to process blower wheel 76 for rotating wheel 76 to generate a flow of air. As shown in FIG. 5, the opening in wall 16 through which shaft 80 passes is provided with a flexible, rubberized seal (such as vicon) for preventing migration of gases from compartment 26 to compartment 32.

A regeneration blower enclosure 84 in lower regeneration compartment 32 is provided with an opening 86 and a regeneration blower wheel 88 which is similar to wheel 76. Wheel 88 is rotatably mounted in enclosure 84, and wheel 88 is driven by the same motor 78 which drives wheel 76.

Figure 2:
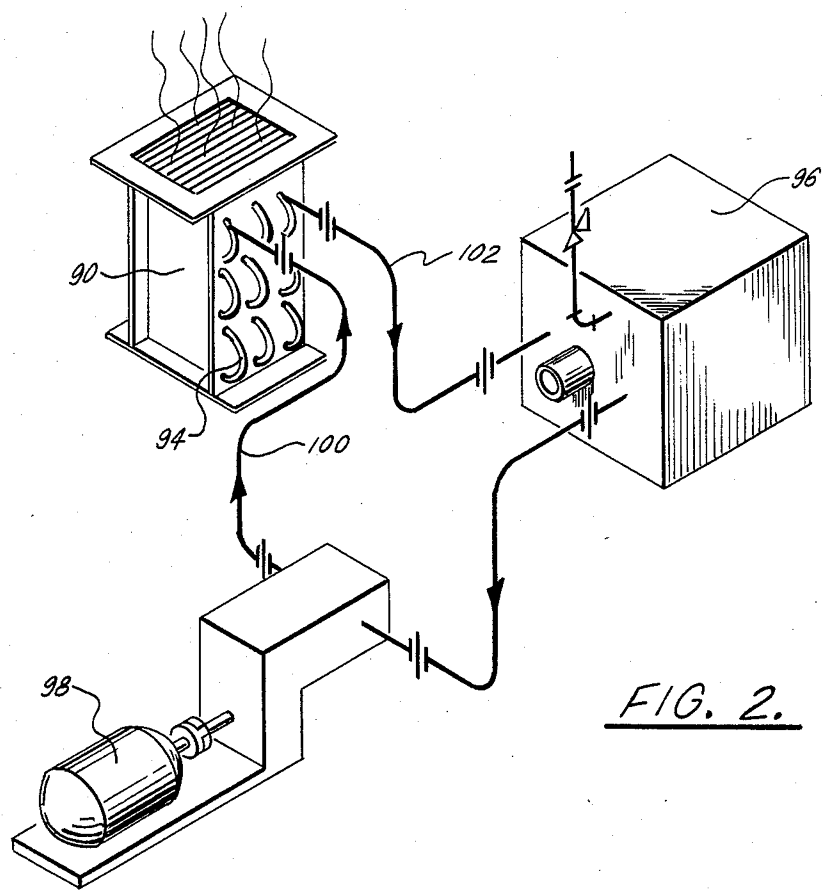
FIG. 2 is a schematic view of the heating element of the present invention.

A heating element is mounted within regeneration compartment 32, the element comprising an elongated metal box 90 having a first open end 92 in fluid communicating relationship with the interior of compartment 32, a second open end (not shown) held in fluid delivering relationship to the perforations 38 in second partition 24, and a tubular heating coil 94 disposed in heat transferring relationship around box 90. As shown in FIG. 2, coil 90 communicates with the interior of box 90 to provide better heating of air flowing through box 90. Box 90 is fixed in any suitable fashion to the face of partition 22 facing compartment 32, thereby fixably holding it in place in fluid delivering relationship to perforations 38.

An oil tank 96 is provided within compartment 32, the oil in tank 96 being pumped through coil 94 to heat box 90. As shown in FIG. 2, a conventional hydraulic pump 98 is employed to pump oil from tank 96 through oil delivery line 100 and back from coil 94 to tank 96 through oil return line 102. In preferred embodiments, the oil in tank 96 is covered by a nitrogen gas blanket to prevent degradation of the hydrocarbon content of the oil.

Figure 3:
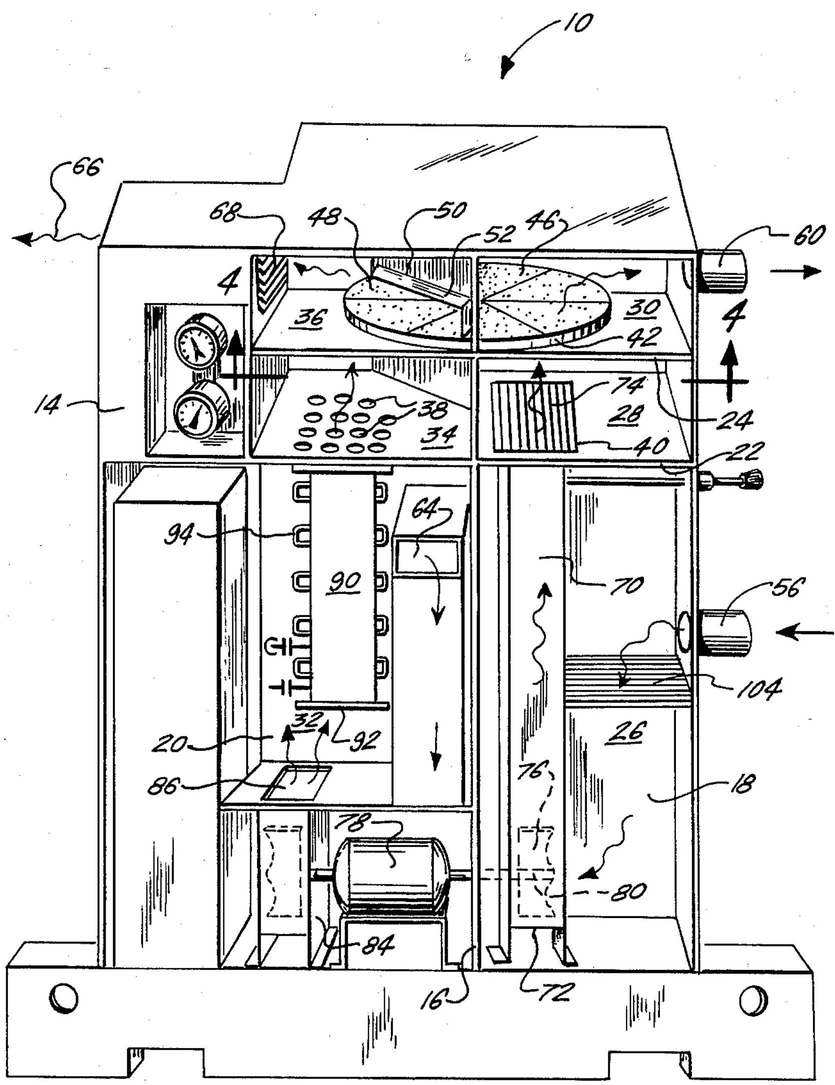
FIG. 3 is a view similar to FIG. 1, the outer wall of the container being broken away for clarity to expose the interior of the compartment.
Figure 4:
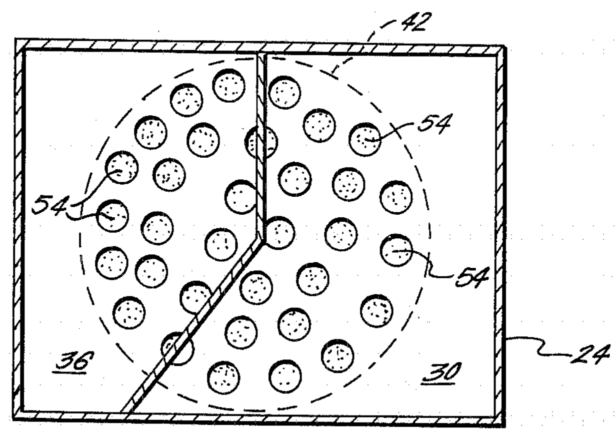
FIG. 4 is a view taken along section lines 4—4 in FIG. 3.

As seen in FIGS. 3 and 4, wall 16 is angled so that compartment 34 is smaller than compartment 28, and compartment 36 is smaller than compartment 30. This orientation of the wall in the upper and intermediate compartments is desirable so that a larger portion of wheel 42 is dedicated to dehumidifying activity, and a relatively smaller portion of wheel 42 is dedicated to regeneration activity. This represents a more efficient utilization of the desiccant in the wheel since a larger portion of the wheel can be used to dehumidify air, while only a relatively smaller portion of the wheel is undergoing regeneration.

In operation, motor 78 is activated by supplying a source of electrical energy (not shown) to begin turning the shafts driving wheels 76, 88. Once the wheels 76, 88 have purged container 14, electrical energy is supplied to tank 96 to heat the oil enclosed therein to a temperature between 250°–320° F. These temperature parameters for regenerating the granular silica gel have been calculated to avoid oil overheating and boiloff, seal deterioration, and unsafe operation of dehumidifier 10. The oil in tank 96 is a highly refined oil having non-flashing properties which is suitable for use with aircraft. The oil evenly heats enclosure 90 and the air moving therethrough, carefully controlling the amount of heat supplied to enclosure 90. The careful regulation of temperature is especially important since overheated surfaces can ignite fumes and result in explosions.

The internal air flow being generated by wheels 76, 88 is balanced by slowly closing off outlet damper 68 until approximately 0.10P is established. Dehumidifier 10 uses two distinct air streams side by side. Consequently, there is a tendency for air to flow from the higher pressure side of the unit to the lower pressure side. If leakage is allowed to occur from upper regeneration compartment 30 to upper process compartment 36, this will cause the moisture level of the dehumidified air to rise, reducing its drying capacity. Therefore, the pressure relationship of the two air streams must be controlled to prevent this loss of drying capacity. This is accomplished by maintaining a slightly greater outlet pressure on the process side 18 of the dehumidifer, this pressure differential between compartments 30, 36 being maintained at approximately +0.05 inches static.

However, an opposite pressure differential must be maintained between compartments 26, 32 to prevent migration of flammable gases from compartment 26 to compartment 32. The pressure in compartment 26 is maintained at a lower level than the pressure in compartment 32 because blower wheel 76 is creating a positive pressure within envelope 70 and directing it into compartment 28. The creation of the positive pressure in enclosure 70 results in a partial vacuum in compartment 26. In the meantime, blower wheel 88 is generating a slightly higher pressure in compartment 32. The pressure in compartment 32 is accordingly maintained at a slightly higher level than the pressure in compartment 26, thereby preventing migration of flammable gases from compartment 26 to compartment 32.

Air moves from compartment 32, through open end 92 and into box 90. It is then conveyed through perforations 38 in partition 22 and then through openings 54 into regeneration section 48 of wheel 42. It thence moves through first damper 68 to regeneration outlet 66 and into the surrounding atmosphere. On the process side, air is drawn in through process inlet 56, passes through filter screen 104 to remove particulates from the air stream, and is drawn through first open end 72 into enclosure 70 whereupon it is directed towards orifice 40 and through second damper 74. The air then moves into intermediate compartment 28 and through openings 54 in partition 24 through process section 46 of wheel 42, and thence back to the flexible envelope through process outlet 60.

We claim:

1. A dehumidifier for flexible envelopes containing flammable gases and air, said dehumidifier comprising:

a container having an upper and lower process compartment and an adjacent upper and lower regeneration compartment, the lower regeneration compartment containing a heating element and electrical motor;

a regeneration wheel containing a dessicant, said wheel being rotatably mounted in said container so that a first section of said wheel extends into said upper process compartment and a second section of said wheel extends into said upper regeneration compartment through a slot between said process and regeneration compartments;

means for conveying air to be dehumidified from outside said container into said process compartment, directing the air through said dessicant in the first section of said wheel, then returning said air to outside said container;

means for generating a flow of heated air through said regeneration compartment and directing said flow of heated air through the second section of said wheel and thence to the exterior of said container; and means for maintaining a higher pressure in the lower regeneration compartment which contains the heating element than in the lower process compartment, the means for maintaining the higher pressure comprising an enclosure within the lower process compartment, a first end of the enclosure being in fluid communication with the upper process compartment and a second end of the enclosure being in fluid communication with the lower process compartment, and a blower within the enclosure which is driven by the motor in the lower regeneration compartment, the blower in the enclosure creating a locally higher pressure within the enclosure which reduces the pressure in the lower process compartment and results in the lower regeneration compartment having a relatively higher pressure.

2. A dehumidifier for flexible envelopes containing flammable gases and air, said dehumidifier comprising:

a container having a process compartment and an adjacent regeneration compartment;

a regeneration wheel containing a dessicant, said wheel being rotatably mounted in said container so that a first section of said wheel extends into said process compartment and a second section of said wheel extends into said regeneration compartment through a slot between said process and regeneration compartments;

means for conveying air to be dehumidified from outside said container into said process compartment, directing the air through said dessicant in the first section of said wheel, then returning said air to outside said container;

means for generating a flow of heated air through said regeneration compartment and directing said flow of heated air through the second section of said wheel and thence to the exterior of said container;

a first partition within said process compartment between said wheel and said means for directing the air through said first section of the wheel, said first partition thereby forming an upper process compartment adjacent said wheel and a lower process compartment, said first partition being provided with an orifice through which air passes from said lower process compartment to said upper process compartment;

a second partition within said regeneration compartment between said wheel and said means for generating a flow of heated air through said second section of said wheel, said second partition thereby forming an upper regeneration compartment adjacent said wheel and a lower regeneration compartment, said second partition being provided with an opening through which said flow of heated air passes from the lower to the upper regeneration compartment;

means for preventing the migration of flammable gases from the lower process compartment to the lower regeneration compartment by establishing a pressure differential between said lower compartments; and means for reversing said pressure differential in said upper compartments so that the pressure in said upper process compartment is greater than the pressure in said upper regeneration compartment thereby preventing migration of undehumidified air from said regeneration to said process compartment in the vicinity of said wheel.

3. The dehumidifier of claim 2, further comprising a first divider between said first partition and said regeneration wheel and a second divider between said second partition and said regeneration wheel, said first and second dividers cooperatively forming a flat surface on which said regeneration wheel is rotatably mounted, said surface being provided with openings through which said flow of air is directed only through said wheel.

4. The dehumidifier of claim 3, wherein said first section of said wheel is of a greater surface area than said second section.

5. The dehumidifier of claim 4, further comprising a flexible flap seal disposed in substantially sealing relationship along said slot between said process and regeneration compartments for reducing the migration of dehumidified air from said process to said regeneration compartment in the vicinity of said wheel.

6. The dehumidifier of claim 5, wherein said means for generating a flow of heated air comprises:

a regeneration inlet through which air enters said regeneration compartment and a regeneration outlet through which air leaves said upper regeneration compartment after passing through said wheel;

a motor disposed within said regeneration compartment;

a regeneration blower wheel within said regeneration compartment and driven by said motor for directing a flow of air towards the openings in said second partition; and a heating element mounted within said regeneration compartment, said element comprising an elongated metal box having a first open end in fluid communicating relationship with the interior of said regeneration compartment, a second end in fluid delivering relationship to the opening in said second partition, a tubular heating coil disposed in heat transferring relationship to said box, and a source of heated oil provided with means for pumping said oil through said tubular heating coil.

7. The dehumidifier of claim 6, wherein said means for reversing said pressure differential between said compartments, comprises:

an enclosure having a first end in fluid communicating relationship with the interior of said process compartment and a second end in fluid delivering relationship to the orifice in said first partition;

a second blower wheel disposed within said enclosure for generating and directing a flow of air towards said orifice in said first partition thereby reducing the pressure in the surrounding process compartment, said second blower wheel being driven by a motor in said regeneration compartment.

8. The dehumidifier of claim 7, further comprising a damper mounted in the orifice of said first partition for regulating the flow of air through the first section of said regeneration wheel and back to said flexible envelope.

9. The dehumidifier of claim 8, wherein said source of heated oil is an oil tank within said process regeneration compartment, the oil in said tank being covered with nitrogen gas to prevent degradation of said oil.

10. The dehumidifier of claim 9 wherein a damper is provided in the orifice in said first partition.

11. A dehumidifier for flexible envelopes containing flammable gases and air, said dehumidifier comprising:

a container divided by an interior wall into a process side and a regeneration side;

first and second partitions within said container transverse to said wall, said partitions and wall forming a lower, intermediate and upper process compartment on said process side and a lower, intermediate and upper regeneration compartment on said regeneration side, said first partition being provided with a perforation for permitting air to flow from said lower to said intermediate regeneration compartments, and an orifice in said first partition for permitting air to flow from said lower to said intermediate process compartments;

a regeneration wheel containing a dessicant, said wheel being rotatably mounted on said second partition that so a process section of said wheel extends into said process compartment and a regeneration section of said wheel extends into said regeneration compartment, said wall being provided with a slot through which said wheel is disposed, said slot being provided with a flexible flap seal for reducing migration of air from said upper regeneration compartment to said upper process compartment, said second partition being provided with openings in the region of said second partition on which said wheel is mounted and through which air may flow from said intermediate compartment through said wheel;

a process inlet into said lower process compartment through which air is conveyed from said flexible envelope, and a process outlet from said upper process compartment through which air is conveyed back to said flexible envelope;

a regeneration inlet into said lower regeneration compartment through which air is conveyed from outside said container, and a regeneration outlet through which air is conveyed from said upper regeneration compartment to the outside of said container, said regeneration outlet being provided with a first damper for regulating the flow of air out of said upper regeneration compartment;

an enclosure within said lower process compartment, said enclosure having a first open end in fluid communicating relationship with the interior of said lower process compartment and a second open end in fluid delivering relationship to the orifice in said first partition;

a second damper in said orifice for regulating the flow of air through said orifice;

a process blower wheel rotatably disposed in said enclosure for generating a flow of air in said enclosure and directing it towards said orifice;

a motor in said regeneration compartment, and a driving shaft extending from said motor to said process blower wheel for rotating said process blower wheel;

an enclosure in said lower regeneration compartment, said enclosure being provided with an opening and a regeneration blower wheel rotatably mounted in said enclosure, said regeneration blower wheel being rotated by a motor in said regeneration compartment;

a heating element mounted within said regeneration compartment, said element comprising an elongated metal box having a first open end in fluid communicating relationship with the interior of said regeneration compartment, a second open end in fluid delivering relationship to the perforation in said second partition, and a tubular heating coil disposed in heat transferring relationship to said box;

an oil tank within said regeneration compartment, the oil in said tank being pumped through said tubular coil to heat said heating element, the oil in said tank being covered by nitrogen gas to prevent degradation of said oil.

* * * * *